United States Patent
Qian et al.

(10) Patent No.: US 11,201,557 B2
(45) Date of Patent: Dec. 14, 2021

(54) CONTROL SYSTEM FOR SYNCHRONOUS RECTIFYING TRANSISTOR OF LLC CONVERTER

(71) Applicants: CSMC TECHNOLOGIES FAB2 CO., LTD., Jiangsu (CN); SOUTHEAST UNIVERSITY, Jiangsu (CN)

(72) Inventors: Qinsong Qian, Wuxi (CN); Shengyou Xu, Wuxi (CN); Feng Lin, Wuxi (CN); Hao Wang, Wuxi (CN); Wei Su, Wuxi (CN); Qi Liu, Wuxi (CN); Longxing Shi, Wuxi (CN)

(73) Assignees: CSMC TECHNOLOGIES FAB2 CO, LTD., Jiangsu (CN); SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 16/959,116

(22) PCT Filed: Dec. 29, 2018

(86) PCT No.: PCT/CN2018/125560
§ 371 (c)(1),
(2) Date: Jun. 29, 2020

(87) PCT Pub. No.: WO2019/129275
PCT Pub. Date: Jul. 4, 2019

(65) Prior Publication Data
US 2020/0336076 A1  Oct. 22, 2020

(30) Foreign Application Priority Data

Dec. 29, 2017 (CN) .......................... 201711480340.9

(51) Int. Cl.
*H02M 3/335* (2006.01)
*H02M 1/00* (2006.01)
*H02M 3/00* (2006.01)

(52) U.S. Cl.
CPC ... *H02M 3/33592* (2013.01); *H02M 3/33515* (2013.01); *H02M 1/0058* (2021.05); *H02M 3/01* (2021.05)

(58) Field of Classification Search
CPC .... H02M 1/0012; H02M 1/0058; H02M 3/01; H02M 3/015; H02M 3/33515; H02M 3/33592
See application file for complete search history.

(56) References Cited

U.S. PATENT DOCUMENTS

| 7,495,934 | B2 * | 2/2009 | Chen ................. | H02M 3/33592 363/21.06 |
| 10,686,386 | B2 * | 6/2020 | Tschirhart ......... | H02M 3/33592 |

(Continued)

FOREIGN PATENT DOCUMENTS

| CN | 107147302 | 9/2017 |
| GN | 203166766 | 8/2013 |

(Continued)

OTHER PUBLICATIONS

International Search Report issued for International Patent Application No. PCT/CN2018/125560, dated Mar. 27, 2019, 5 pages including English translation.

(Continued)

*Primary Examiner* — Fred E Finch, III
(74) *Attorney, Agent, or Firm* — Hamre, Schumann, Mueller & Larson, P.C.

(57) ABSTRACT

A control system for synchronous rectifying transistor of LLC converter, the system comprising a voltage sampling circuit, a high-pass filtering circuit, a PI compensation and effective value detection circuit, and a control system taking a microcontroller (MCU) as a core. When the LLC converter is operating at a high frequency, a drain-source voltage $V_{DS(SR)}$ of the synchronous rectifying transistor delivers, via the sampling circuit, a change signal of the drain-source (Continued)

voltage during turn-off into the high-pass filtering circuit and the PI compensation and effective value detection circuit to obtain an effective value amplification signal of a drain-source voltage oscillation signal caused by parasitic parameters, and the current value is compared with a previously collected value via a control circuit taking a microcontroller (MCU) as a core, so as to change a turning-on time of the synchronous rectifying transistor in the next period.

17 Claims, 6 Drawing Sheets

(56) References Cited

U.S. PATENT DOCUMENTS

| | | | | |
|---|---|---|---|---|
| 2010/0188871 | A1* | 7/2010 | Kim | H02M 3/33592 363/21.03 |
| 2015/0103563 | A1* | 4/2015 | Wang | H02M 3/33592 363/17 |
| 2015/0109824 | A1* | 4/2015 | Chen | H02M 3/22 363/17 |
| 2015/0214850 | A1 | 7/2015 | Lin et al. | |
| 2015/0280584 | A1* | 10/2015 | Gong | H02M 3/33515 363/21.13 |
| 2020/0112244 | A1* | 4/2020 | Chen | H02M 3/33515 |

FOREIGN PATENT DOCUMENTS

| | | |
|---|---|---|
| GN | 106487228 | 3/2017 |
| GN | 107425728 | 12/2017 |

OTHER PUBLICATIONS

Fei, C et al., "Digital Implementation of Adaptive Synchronous Rectifier (SR) Driving Scheme for LLC Resonant Converters," IEEE Applied Power Electronics Conference and Exposition (APEC), 2016, pp. 322-328.

Shiyong, X., "Study on digital LLC resonant converter," A Dissertation Submitted to Guangdong University of Technology for the Degree of Master of Signal and Information Processing (Master of Engineering Science), May 2015, 76 pages including English abstract on pp. III and IV.

* cited by examiner

CONTROL SYSTEM FOR SYNCHRONOUS RECTIFYING TRANSISTOR OF LLC CONVERTER

TECHNICAL FIELD

The application relates to a control method for synchronous rectifying transistor of LLC converter (resonant converter), in particular to a control system and method for synchronous rectifying transistor of LLC resonant converter.

BACKGROUND

With the continuous development of power technology, LLC resonant converter has gradually become a recognized power topology. It has the innate advantages of ZVS on of primary power transistor and ZCS off of synchronous rectifying transistor, so that it can achieve higher efficiency than other conventional topologies. However, when the LLC resonant converter works with low voltage and large current output, the loss of the rectifier diode increases greatly due to the large conduction impedance thereof, therefor the working efficiency is reduced. The synchronous rectification technology is proposed, by using the conduction of power transistor instead of the diode, it can effectively improve the working efficiency of LLC converter when working in the condition of low voltage and large current, since the conduction impedance of the power transistor is smaller than the conduction impedance of the diode. There are three kinds of synchronous rectifying transistor mode, including determining whether the bulk diode of the synchronous rectifying transistor is conductive or not to control the turning-on and turning-off of the synchronous rectifying transistor by collecting the current flowing through the synchronous rectifying transistor and by collecting the drain source voltage of the synchronous rectifying transistor $V_{DS\,(SR)}$; and a control mode of the digital synchronous rectifying transistor by collecting the drain source voltage $V_{DS(SR)}$ of the synchronous rectifying transistor, which is widely used. nowadays. These three modes have the following features respectively:

(1) It is the most accurate control mode by collecting the current flowing through the synchronous rectifying transistor. It can accurately determine turning-on and turning-off of the synchronous rectifying transistor. However, the loss of the sampling resistor used for collecting the current is too large, so it is gradually abandoned;

(2) By the mode of collecting the voltage between the drain and the source, the turning-off point of the synchronous rectifying transistor will be always switched back and forth between the forward conductive state and reverse conductive state of the bulk diode, and the conduction of the bulk diode will bring additional conduction loss;

(3) The mode of self-adaptive conduction of the synchronous rectifying transistor can be realized by a digital synchronous rectifying transistor technology using microcontroller MCU. However, at high frequency, due to the influence of is parasitic parameters in the system, it will make the collection more difficult, leading to the occurrence of false turning-on and false turning-off. These parasitic parameters will make the turning-on and turning-off of the synchronous rectifying transistor often accompanying with the generation of high frequency oscillation signal, such that the detection of sampling circuit or microcontroller will deviate. Therefore, a false control signal is generated for the driver of the synchronous rectifying transistor, affecting the working state of the converter, and reducing the working efficiency of the converter.

Therefore, when the LLC resonant converter works at a high frequency, it is necessary to consider the presence of parasitic parameters, such as parasitic inductance and parasitic capacitance etc. around the synchronous rectifying transistor due to device packaging and PCB layout. The big issue to be resolved is to design a kind of control system for synchronous rectifying transistor with strong anti-noise ability and adaptive control according to the oscillation signal.

SUMMARY

According to various embodiments of the present application, a control system and method :for synchronous rectifying transistor of LLC converter are provided.

A control system for synchronous rectifying transistor of LLC converter includes two control units with the same structure, which control two synchronous rectifying transistors respectively. Each control unit of a synchronous rectifying transistor includes a voltage sampling circuit, a high-pass filter circuit, a PI compensation and effective value detection circuit, and a control circuit having a microcontroller MCU as a core. The voltage sampling circuit is configured to collect a voltage $V_{DS(SR)}$ between a drain and a source of a secondary synchronous rectifying transistor during turning-off of the secondary synchronous rectifying transistor, and convert the voltage signal $V_{DS\,(SR)}$ into $V_{samp}$, so as to output $V_{samp}$ to the high-pass filter circuit. The high pass filter circuit is configured to filter out a. direct current component in $V_{samp}$, remaining an alternating current component $V_{hp}$ of an oscillation signal generated by a resonance of parasitic inductance and parasitic capacitance, output the alternating current component $V_{hp}$ of the oscillation signal to the PI compensation and effective value detection circuit for compensating and amplifying, so as to obtain an effective value level $V_{SR}$ of a jitter signal due to resonance after processing; and output the effective value level $V_{SR}$ to the control circuit having a microcontroller MCU as a core. A current value of $V_{SR}$ is compared with the last collected value by the control unit internal the microcontroller, and then. a driving signal is generated by a timer to change a turning-on time of the synchronous rectifying transistor in a next cycle, so that the synchronous rectifying transistor can be turned off at an optimal turning-off point and work at an optimal efficiency point.

A control method for synchronous rectifying transistor of LLC converter includes collecting a voltage $V_{DS\,(SR)}$ between a drain and a source of a secondary synchronous rectifying transistor during turning-off of the secondary synchronous rectifying transistor, and converting the $V_{DS\,(SR)}$ into a voltage signal $V_{samp}$; filtering out a direct current component in the voltage signal $V_{samp}$ by a high-pass filter circuit, remaining an alternating current component $V_{hp}$ of an oscillating signal generated by a resonance of parasitic inductance and parasitic capacitance; compensating and amplifying the alternating current component $V_{hp}$ to obtain an effective value level $V_{SR}$ of a jitter signal due to resonance after processing; and comparing a current value of the effective value level $V_{SR}$ with the $V_{SR}$ obtained when the secondary synchronous rectifying transistor was turned off last time, and Obtaining a driving signal according to the comparison result to control a turning-on time of the secondary synchronous rectifying transistor in the next cycle.

Details of one or more embodiments of the present application are set forth in the following drawings and descriptions. Other features, purposes and advantages of the present application will become apparent from the description, drawings and claims.

BRIEF DESCRIPTION OF THE DRAWINGS

In order to more clearly explain the technical solution in the embodiment or exemplary technology of the application, the following will briefly introduce the drawings needed in the embodiment or exemplary technical description. Obviously, the drawings in the following description are only some embodiments of the application. For those skilled in the art, drawings of other embodiments can be obtained according to these drawings without any creative efforts.

DETAILED DESCRIPTION

In order to make the purpose, technical solution and advantages of the application clearer, the application will be further described in detail below in combination with the drawings and embodiments. It should be understood that the specific embodiments described herein are only used to interpret the application and are not used to limit the application.

Figure 1:
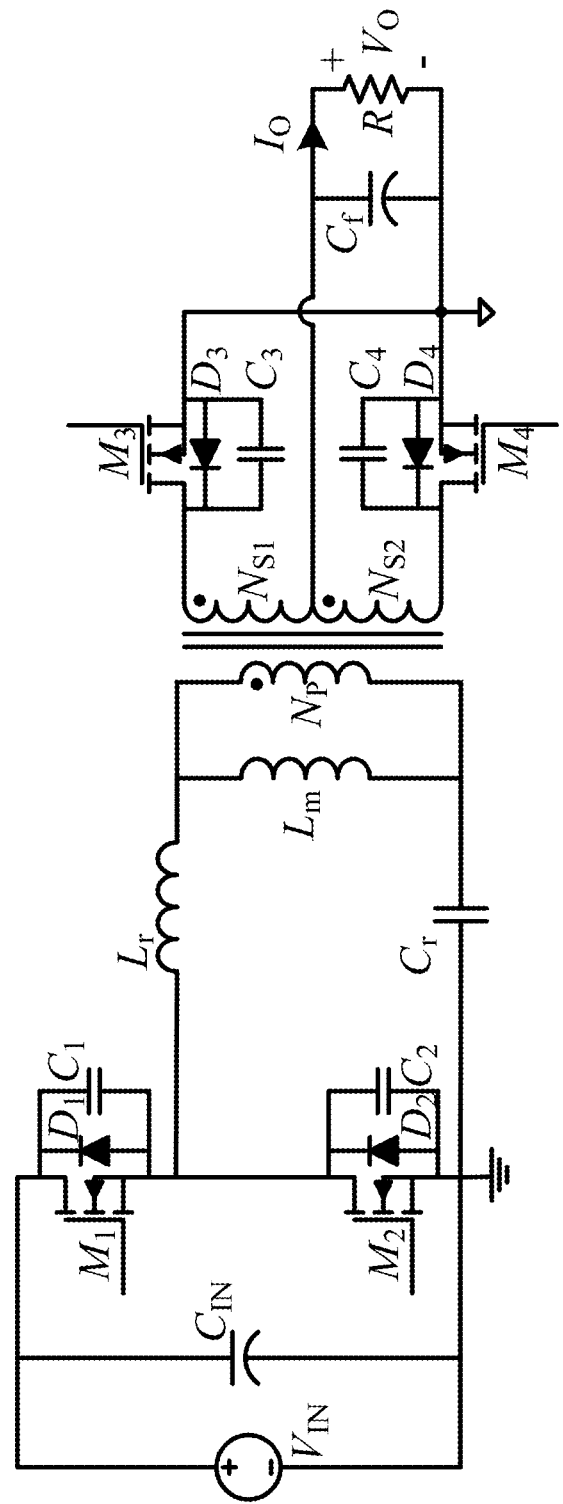
FIG. 1 is a circuit schematic diagram of an exemplary synchronous rectifying transistor LLC resonant converter.

As shown in FIG. 1, the circuit elements of an exemplary synchronous rectifying transistor TIC resonant converter include power transistors $M_1$ and $M_2$, a resonance capacitor $C_r$, a resonance inductor $L_r$, and an excitation inductor $L_m$, which are on the primary side of transformer; and synchronous rectifying transistors $M_3$ and $M_4$, an output capacitor $C_f$ and a load R, etc., which are on the secondary side of transformer. $D_1$ and $D_2$ are the parasitic diodes of power transistors $M_1$ and $M_2$ respectively, $C_1$ and $C_2$ are the parasitic capacitors of $M_1$ and $M_2$, $D_3$ and $D_4$ are the parasitic diodes of synchronous rectifying transistors $M_3$ and $M_4$, $C_3$ and $C_4$ are the parasitic capacitors of synchronous rectifying transistors $M_3$ and $M_4$.

Figure 2:
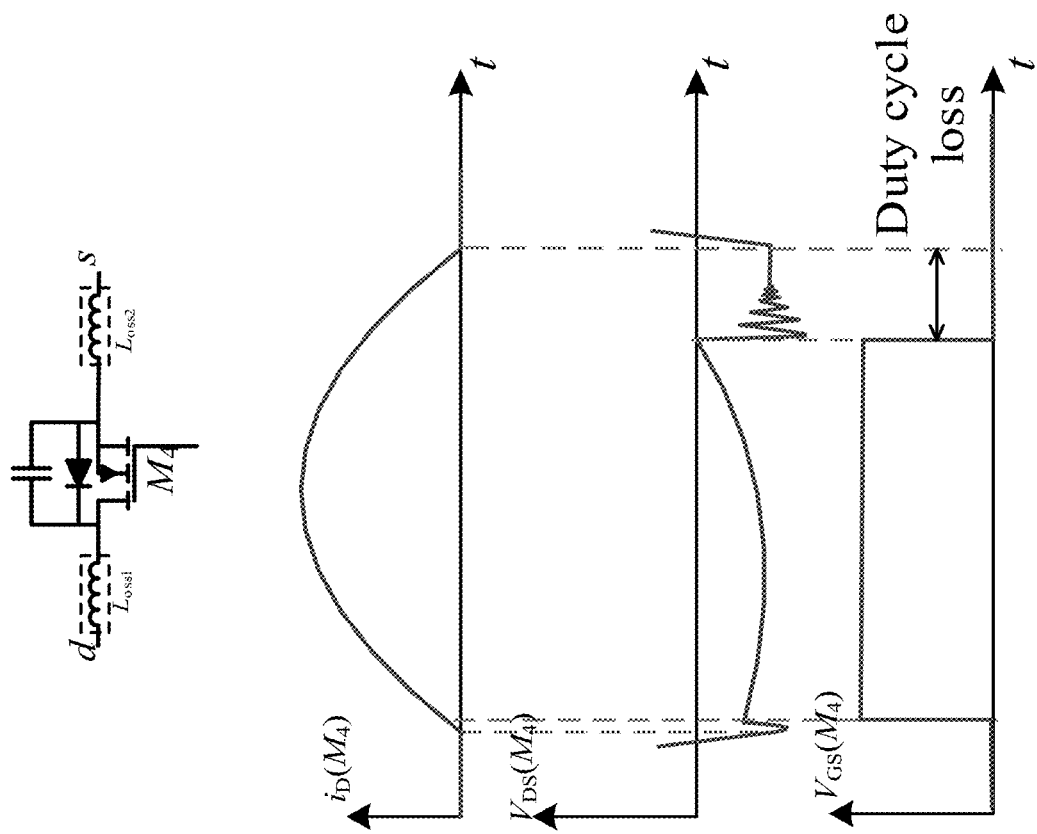
FIG. 2 is a comparison diagram illustrating the duty cycle loss of turning-on time of a synchronous rectifying transistor considering parasitic inductance.
Figure 2:
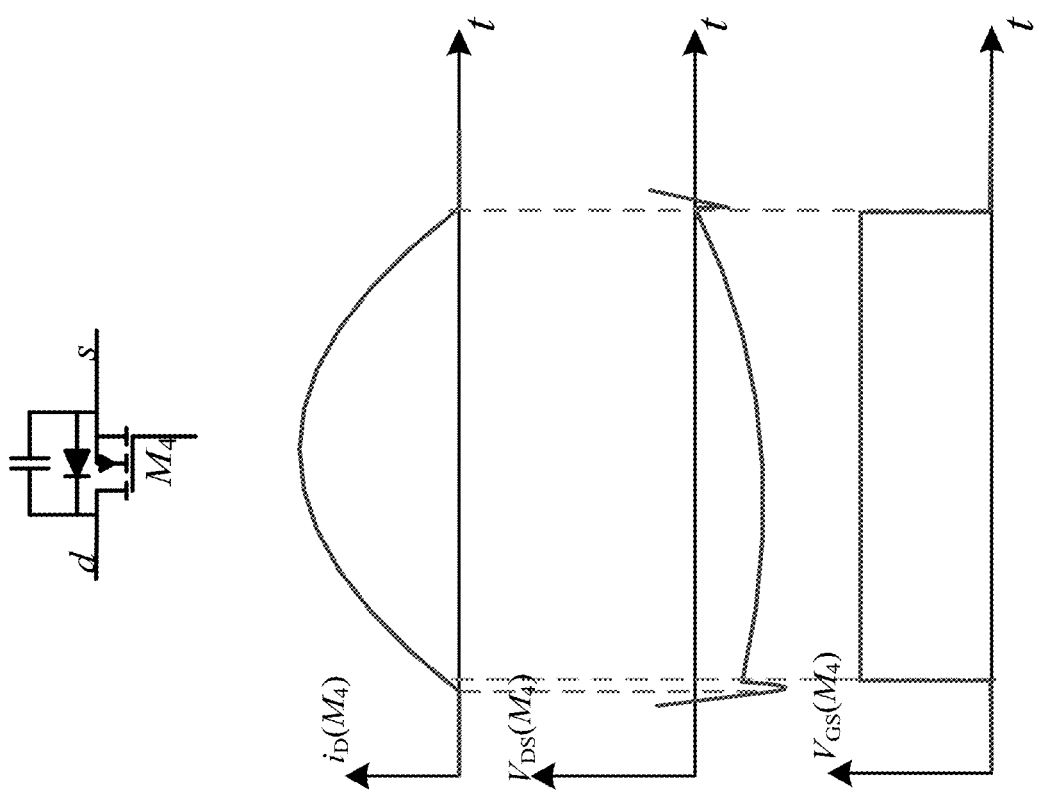

As shown in FIG. 2, the impacts of parasitic inductance on the turning-on time of synchronous rectifying transistor are compared, when the LLC resonant converter works at low frequency and high frequency respectively. When the LLC resonant converter works at low frequency, the parasitic inductance in the system is very small, and the impact on the system can be ignored. It can achieve accurate control by collecting the voltage $V_{DS(SR)}$ between the drain and the source of the synchronous rectifying transistor without duty cycle loss. However, when the LLC resonant converter works at high frequency, the impact of the parasitic inductance on the system becomes very severe. The control mode of $V_{DS(SR)}$ realized by conventional collecting the voltage between the drain and the source of the synchronous rectifying transistor will make the synchronous rectifying transistor turn off in advance, which will cause the duty cycle loss. As a result, a portion of electric current after the synchronous rectifying transistor turned off flows through the bulk diode thereof, which will additionally increase the conduction loss of the bulk diode and reduce the working efficiency of the system. Further, due to the presence of parasitic inductance and capacitance in the circuit, when the system works at high frequency, the parasitic inductance at both terminals of the synchronous rectifying transistor will resonate with the adjacent parasitic capacitance, which will cause the waveform oscillation of the voltage $V_{DS(SR)}$ between the drain and the source of the synchronous rectifying transistor.

Figure 3:
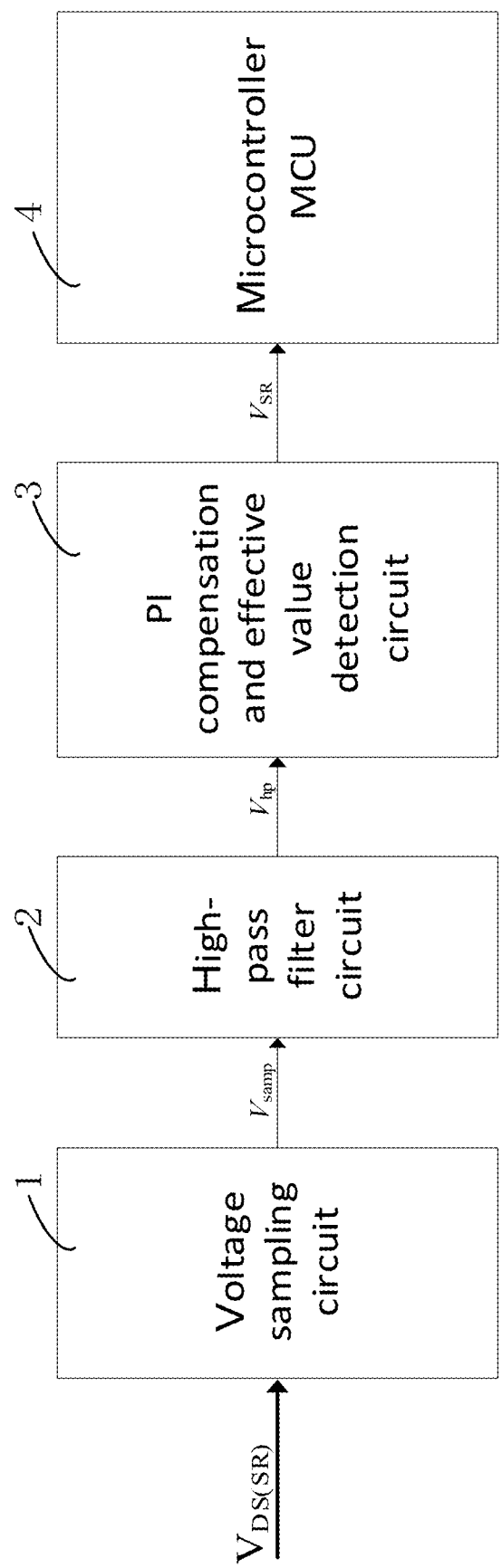
FIG. 3 is a block diagram of a digital control system of a synchronous rectifying transistor TIC resonant converter provided by the present disclosure.

FIG. 3 is a block diagram of the control system for synchronous rectifying transistor of LLC resonant converter of the present disclosure, the control system includes a sampling circuit 1, a high-pass filter circuit 2, a PI compensation and effective value detection circuit 3, and a control system 4 having a microcontroller MCU as a core. The sampling circuit 1 is configured to collect the voltage $V_{DS(SR)}$ between the drain and the source of the synchronous rectifying transistor, which will be processed by the high-pass filter circuit 2, remaining a resonance signal at the high frequency of parasitic inductance and parasitic capacitance. Then, the signal passes through the PI compensation and the effective value detection circuit 3 to obtain an effective value potential after the amplification of the resonance signal. Finally, the effective value potential passes through the control system 4 having a MCU as a core, after being processed by the control unit internal the MCU, a driving signal is generated to control turning-on and turning-off of the synchronous rectifying transistor.

Figure 4:
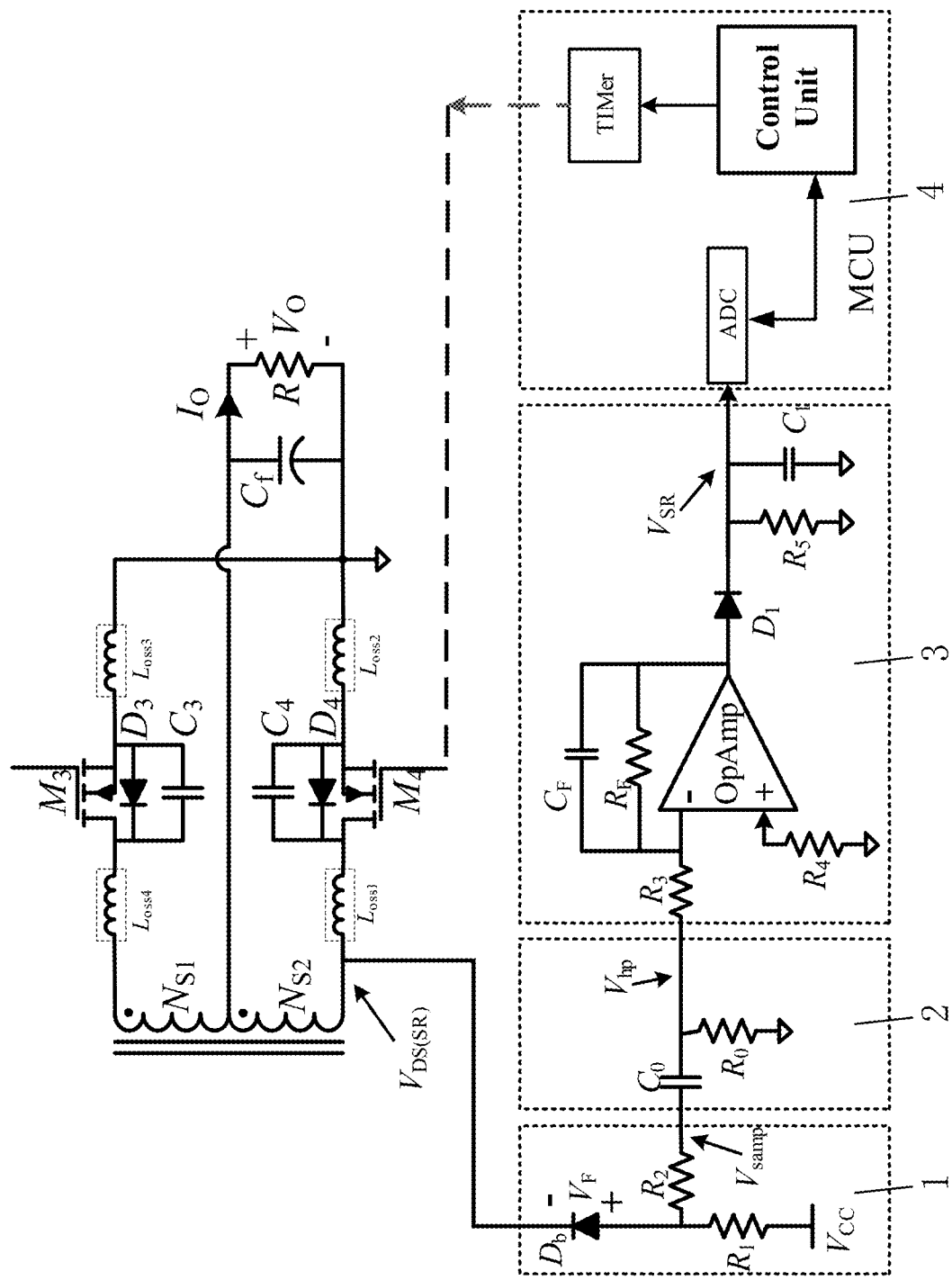
FIG. 4 is a circuit schematic diagram of the present disclosure.

As shown in FIG. 4, the sampling circuit 1 includes a resistor $R_1$, a resistor $R_2$ and a diode $D_b$. The sampling circuit 1 is configured to sample the voltage $V_{DS\ (SR)}$ between the drain and the source of the secondary synchronous rectifying transistor of the LLC resonant converter, and transmit the processed drain source voltage $V_{DS\ (SR)}$ to the high-pass filter circuit 2. One terminal of resistor $R_1$ is connected to the power voltage $V_{cc}$, the other terminal of resistor $R_1$ is connected to one terminal of resistor $R_2$ and the anode of diode $D_b$, and the cathode of diode $D_b$ is connected to the drain of the synchronous rectifying transistor $M_4$ (or $M_3$) on the secondary side of the LLC converter.

The high-pass filter circuit 2 is configured to filter out the direct current component in the voltage signal outputted by the sampling circuit, remaining the alternating current component of the oscillating signal generated by the resonance of parasitic inductance and parasitic capacitance. The circuit elements include a resistor $R_0$ and a capacitor $C_0$, one terminal of capacitor $C_0$ is connected to the other terminal of resistor $R_2$ in the voltage sampling circuit, the other terminal of capacitor $C_0$ is connected to one terminal of resistor $R_0$ as the output terminal of high-pass filter circuit 2, and the other terminal of resistor $R_0$ is grounded.

The PI compensation and effective value detection circuit 3 is configured to compensate and amplify the AC signal that is output by the high-pass filter circuit to obtain an effective value potential after processing. It includes an operational amplifier OpAmp, a resistor $R_3$, a resistor $R_4$, a resistor a resistor $R_F$, a capacitor $C_1$, a capacitor $C_F$, and a diode $D_1$. One terminal of resistor $R_3$ is connected to the output terminal of high-pass filter circuit, the other terminal is connected to the inverting terminal of operational amplifier OpAmp, one terminal of resistor $R_4$ is connected to the non-inverting terminal of operational amplifier OpAmp, and the other terminal is grounded. The resistor $R_F$ is connected to the capacitor $C_F$ in parallel, of which one terminal is connected to the inverting terminal of the operational amplifier OpAmp, the other terminal is connected to the output terminal of the operational amplifier OpAmp and to the anode of the diode $D_1$. The resistor $R_5$ is connected to the capacitor $C_1$ in parallel, of which one terminal is connected to the cathode of diode $D_1$ as an output terminal of this circuit, and the other terminal to is grounded.

The control circuit 4 having MCU as a core is configured to collect an output $V_{SR}$ of the PI compensation and effective value detection circuit 3 after the synchronous rectifying transistor is turned off in each cycle, and output a driving signal after being processed by the internal ADC and control unit to control the turning-on and turning-off of the synchronous rectifying transistor. It includes an analog-digital converter ADC, a control unit and a timer TIMer. The input terminal of the analog-digital converter ADC is connected to the output terminal of the PI compensation and effective value detection circuit. The output of analog-digital converter ADC and the control unit: are in double-way connection. The output of control unit is connected to the gate of synchronous rectifying transistor $M_4$ (or $M_3$) on the secondary side of LLC resonant converter via an output of the timer TIMer.

Figure 5:
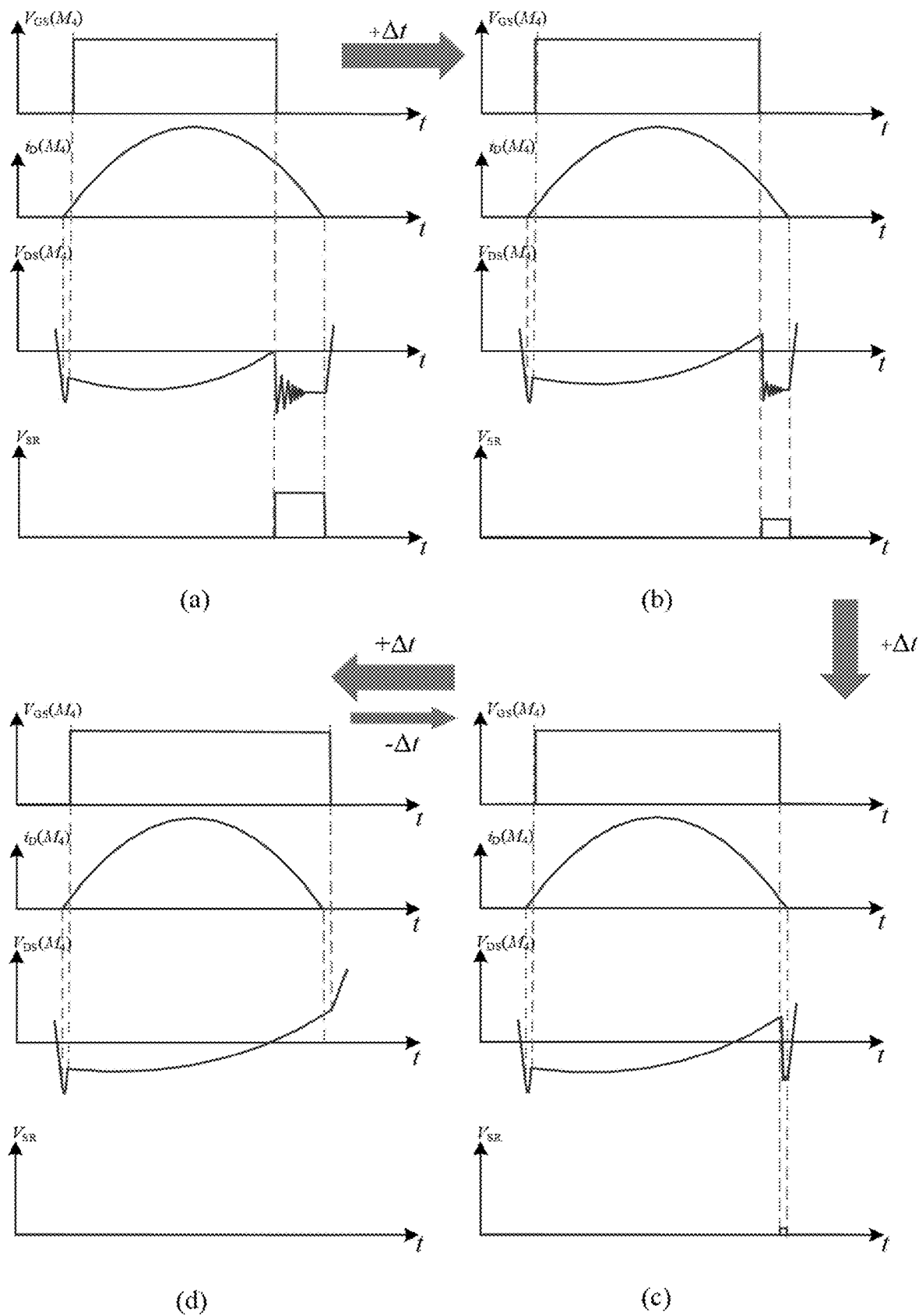
FIG. 5 is a schematic diagram of the circuit working process of the present disclosure.

FIG. 5 is a schematic diagram of the control mode of the synchronous rectification control system proposed in the present disclosure, When LLC resonant converter works at high frequency, there will be an oscillation due to the presence of parasitic inductance and parasitic capacitance. The oscillation amplitude of the voltage between the drain and the source of the synchronous rectifying transistor is related to the timing of turning-off. If the synchronous rectifying transistor is turned. off earlier, since the electric current flowing through the synchronous rectifying transistor is still very large at that moment, turning-off of the synchronous rectifying transistor will cause a huge oscillation amplitude of the voltage between the drain and the source of the synchronous rectifying transistor. If the synchronous rectifying transistor is turned off when the electric current flowing through the synchronous rectifying transistor is small, the oscillation amplitude will be significantly reduced. The synchronous rectifying transistor is turned off after the electric current flowing through the synchronous rectifying transistor equals to 0, basically it will not cause the voltage oscillation between the drain and the source of the synchronous rectifying transistor. Therefore, according to this principle, the workflow of the synchronous rectification control system and control mode of the disclosure is as follows:

(1) When the synchronous rectifying transistor is turned off, the voltage between the drain and the source of the synchronous rectifying transistor is output after being processed by the sampling circuit, the high-pass filter circuit, and the PI compensation and effective value detection circuit. The microcontroller collects an output voltage $V_{SR}$ of the PI compensation and effective value detection circuit by the internal analog-to-digital converter ADC, and converts the value into a digital quantity after being processed by the analog-to-digital converter of the microcontroller. Then the digital quantity is stored in the control unit of the microcontroller and recorded as $V_{SR0}$;

(2) When the synchronous rectifying transistor is turned off at next time, the output $V_{SR}$ of the PI compensation and effective value detection circuit is also collected, and the value is converted into a digital quantity after being processed by the analog-to-digital converter of the microcontroller. Then the digital value is stored in the control unit of the microcontroller and recorded as $V_{SR1}$;

(3) By comparing the data $V_{SR0}$, $V_{SR1}$ collected in (1) and (2) and a set threshold $V_{TH}$, the turning-on time of the synchronous rectifying transistor in the next cycle is defined by the control unit, which includes two modes. The value of $V_{TH}$ depends on a specific working state of the system. In a normal circumstances, the value of $V_{TH}$ is set to be 0.

1) When the microcontroller detects and determines a potential relationship as $V_{SR0}>V_{SR1}>V_{TH}$ for the first time, the control unit will add a high-level time period $\Delta t$ to the turning-on time of the synchronous rectifying transistor in the next cycle, in other words, the turning-off time of the synchronous rectifying transistor in the next cycle is delayed. After the current comparison is completed, the control unit replaces $V_{SR0}$ with $V_{SR1}$ and proceeds to the sampling preparation stage of the next cycle; until the determining condition reaches to $V_{SR0}>V_{SR1}=V_{TH}$, the control unit will subtract a turning-on time period $\Delta t$ of the synchronous rectifying transistor, and return to the previous state, and a fixed turning-on time is kept constant in the next cycle.

2) When the microcontroller detects and determines the potential relation as $V_{SR0}=V_{SR1}=V_{TH}$ for the first time, the control unit will subtract a high-level time period $\Delta t$ from the turning-on time of the synchronous rectifying transistor in the next cycle, in other words, the turning-off time of the synchronous rectifying transistor in the next cycle is advanced; until the determining condition reaches to $V_{SR1}>V_{SR0}=V_{TH}$, the current turning-on time of the synchronous rectifying transistor will be kept constant in the next cycle by the control unit.

(4) According to the result of determination compared in (3), the microcontroller MCU generates a driving signal by setting a value of the internal timer TIMer, so as to define the turning-on time of the synchronous rectifying transistor in the next cycle and implement the control function. Further, the control unit in microcontroller MCU detects every 10 switching cycles of the converter to check whether the determining condition is still satisfied. If it is satisfied, then the synchronous rectifying transistor continues to work according to the original working state. If it is not satisfied any more, then a new working state is re-detected and determined according to the control process in (3).

Taking the synchronous rectifying transistor $M_4$ as an example, FIG. 5(a) is assumed to illustrate the $V_{SR}$ value sampled by microcontroller MCU this time, the electric current $i_{D\ (M4)}$, the voltage $V_{DS\ (M4)}$ between the drain and the source, and the gate driving signal $V_{GS\ (M4)}$ of the tested synchronous rectifying transistor are also shown in the figure. After collected by the microcontroller, the $V_{SR}$ value is firstly converted into a digital quantity internally, and then it is automatically recorded as $V_{SR1}$, and is compared with the last sampling value $V_{SR0}$. When $V_{SR1}$ is less than $V_{SR0}$, $V_{SR1}$ is compared with the threshold $V_{TH}$ which is set internally by the microcontroller. When $V_{SR1}$ is greater than $V_{TH}$, a time period $\Delta t$ is automatically added to the synchronous rectification turning-on time in the next cycle (as shown in FIG. 5(b)), and then the $V_{SR0}$ is replaced by the current $V_{SR1}$. The value of $V_{TH}$ depends on a specific working state of the system. In normal circumstances, the value of $V_{TH}$ is set to be 0.

Similarly, in FIG. 5(b), the collected value of the output potential $V_{SR}$ of the PI compensation and effective value detection circuit is converted into a digital quantity internal the microcontroller, and recorded as $V_{SR1}$. Comparing with the latest converted $V_{SR0}$ of last cycle (as shown in FIG.

5(a)), when $V_{SR1}$ is less than $V_{SR0}$ and greater than $V_{TH}$, a time period Δt will be automatically added to the synchronous rectification turning-on time of the next cycle (as shown in FIG. 5(c)), then the $V_{SR0}$ is replaced by the current $V_{SR1}$.

The process in FIG. 5(c) is exactly the same as the process in FIG. 5(b). In FIG. 5(d), after converted into digital amount, the value $V_{SR1}$ collected by the microcontroller is compared with the newly generated. $V_{SR0}$ value in FIG. 5(c). When $V_{SR1}$ is less than $V_{SR0}$ but greater than $V_{TH}$, the synchronous rectification turning-on time in the next cycle which is set by the microcontroller will not increase, instead, a turning-on time period ΔT will be subtracted, and it will return to the state of FIG. 5(c). Since the state in FIG. 5(d) has already shown that the turning-on time of the synchronous rectifying transistor has reached to the maximum, it cannot be increased any more, otherwise, the delayed turning-off time will be longer, which will affect the performance of the system. After returning to the state in FIG. 5(c), the microcontroller detects every 10 working cycles of the converter, and observes whether the turning-on time of the synchronous rectifying transistor changes due to the influence of external conditions. If it has been changed, then it will be adjusted according to the above control process. If it has not been changed, it will remain the original state, and then it will be detected again after 10 cycles, and so on.

The disclosure has the following advantages and significant effects:

(1) Taking the advantage of the presence of parasitic parameters such as parasitic inductance and parasitic capacitance around the synchronous rectifying transistor when the system works at a high frequency, the voltage oscillation between the drain and the source will be caused when the synchronous rectifying transistor is turned off, so as to realize the correct driving of the synchronous rectifying transistor and allow the system work efficiently, (2) Taking the advantage of high-pass filter and compensation circuit, a direct current value is output by the collected voltage oscillation signal between the drain and the source after being processed in a certain period of time when the synchronous rectifying transistor is turned off. The result is accurate. Further, in a stable state, the secondary synchronous rectifying transistor has a fixed turning-on time, without occupying too much microcontroller MCU resources, such that the MCU can have more space to process other tasks.

(3) Taking the advantage of the microcontroller MCU to realize the digital control, and adopting the self-adaptive synchronous rectification algorithm, the working frequency of the LLC resonant converter can be caused according to the changes of load or input, so as to realize the self-adaptive control of the turning-on time of the synchronous rectifying transistor.

A control method for synchronous rectifying transistor of LLC converter is also provided by this disclosure, the method includes: the voltage $V_{DS\ (SR)}$ between the drain and the source of the secondary synchronous rectifying transistor is collected during the turning-off time of the secondary synchronous rectifying transistor, and converted into a voltage signal $V_{samp}$. The high-pass filter circuit filters out the direct current component in the voltage signal $V_{samp}$, remaining an alternating current component $V_{hp}$ of the oscillation signal caused by the resonance of parasitic inductance and parasitic capacitance. The alternating current component $V_{hp}$ is compensated and amplified to obtain an effective value level $V_{SR}$ of the jitter signal due to resonance after processing. Then, the current value of the effective value level $V_{SR}$ is compared with the $V_{SR}$ obtained when the secondary synchronous rectifying transistor was turned off last time. A driving signal is obtained according to the comparison result, so as to control the turning-on time of the secondary synchronous rectifying transistor in the next cycle.

In one embodiment, the driving signal is used to turn off the secondary synchronous rectifying transistor at an optimal turning-off point, so that the synchronous rectifying transistor works at an optimal efficiency point.

In one embodiment, a storage unit is also included for storing a digital quantity of the effective value level $V_{SR}$ obtained at each time the secondary synchronous rectifying transistor is turned off.

In one embodiment, the step of comparing the current value of the effective value level $V_{SR}$ with the $V_{SR}$ obtained when the secondary synchronous rectifying transistor was turned off last time, and obtaining a driving signal according to the comparison result comprises:

when $V_{SR0}>V_{SR1}>V_{TH}$, the turning-on time of the secondary synchronous rectifying transistor in the next cycle is increased; the turning-on time of the secondary synchronous rectifying transistor is kept constant until $V_{SR0}>V_{SR1}=V_{TH}$;

when $V_{SR0}=V_{SR1}=V_{TH}$, the turning-on time of the secondary synchronous rectifying transistor in the next cycle is decreased, the turning-on time of the secondary synchronous rectifying transistor is kept constant until $V_{SR1}>V_{SR0}=V_{TH}$;

wherein, $V_{SR1}$ is the current value of the effective value level $V_{SR}$, $V_{SR0}$ is the $V_{SR}$ obtained when the secondary synchronous rectifying transistor was turned off last time, and $V_{TH}$ is a preset threshold value.

In one embodiment, the turning-on time increased at each time is constant, and equals to the turning-on time decreased at each time.

In one embodiment, the $V_{TH}=0$.

In one embodiment, when $V_{SR0}>V_{SR1}=V_{TH}$ and after the turning-on time of the secondary synchronous rectifying transistor is kept constant, and when $V_{SR1}=V_{SR0}=V_{TH}$ and after the turning-on time of the secondary synchronous rectifying transistor is kept constant, the step of detecting and comparing the current value of the effective value level $V_{SR}$ with the $V_{SR}$ obtained when the secondary synchronous rectifying transistor was turned off last time is re-performed every a first preset time length.

In one embodiment, the first preset time length is 10 switching cycles of the LLC converter.

In one embodiment, the step of obtaining a driving signal according to the comparison result is generating a driving signal by means of a timer.

In one embodiment, the method further includes a step of setting a fixed time length by means of the timer in each switching cycle of the LLC converter; the step of collecting the voltage $V_{DS(SR)}$ between the drain and the source of the secondary synchronous rectifying transistor during the turning-off time of the secondary synchronous rectifying transistor is sampling with the timer; the step of compensating and amplifying the alternating current component $V_{hp}$, to obtain the effective value level $V_{SR}$ of the jitter signal due to resonance after processing is performing an interrupt process to sample the effective value level $V_{SR}$ when a falling edge of the timer reaches.

Figure 6:
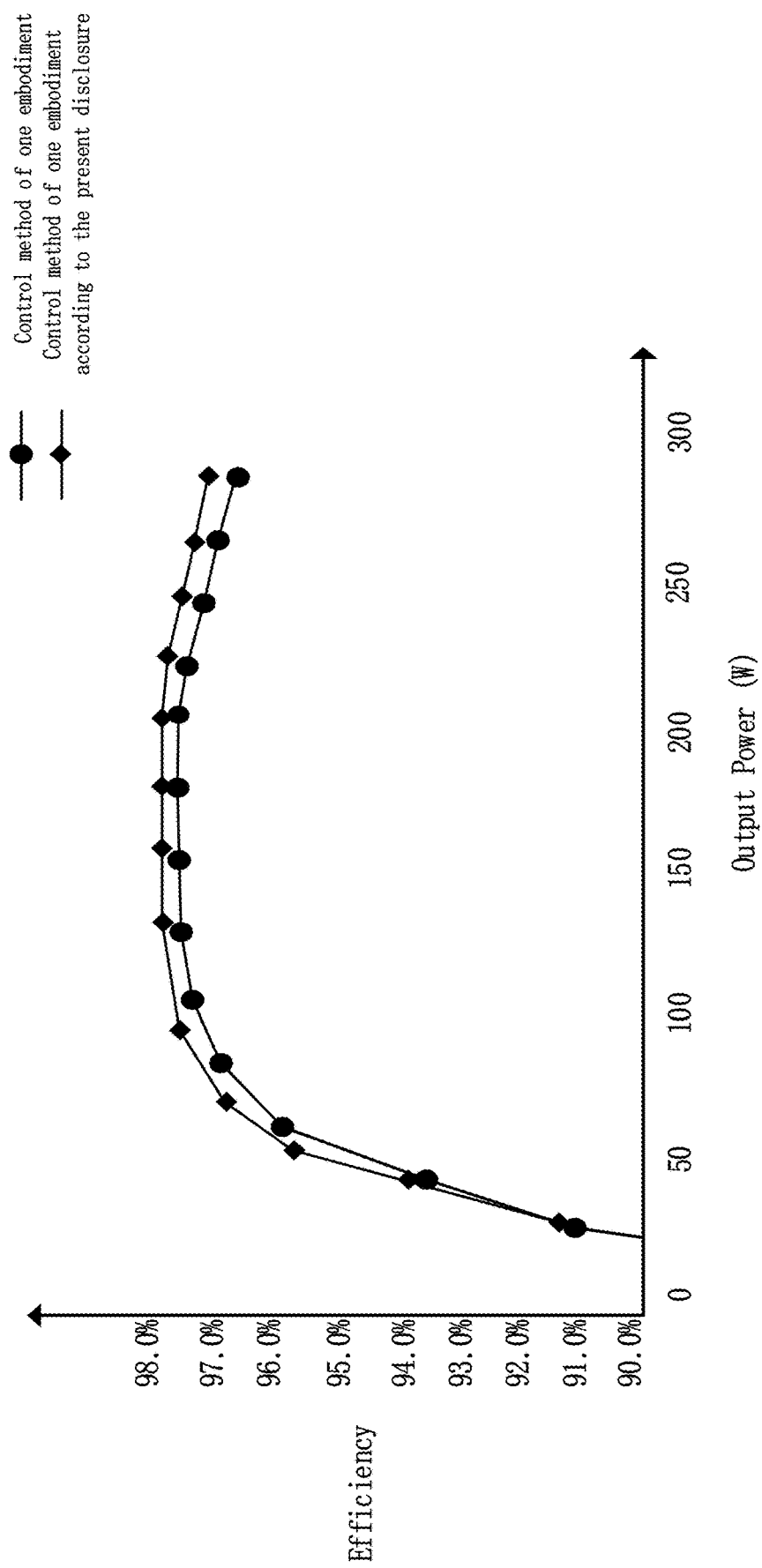
FIG. 6 is an efficiency comparison curve of the synchronous rectification solutions according to the present disclosure and the prior art.

FIG. 6 is an efficiency comparison diagram of the control system and control method for synchronous rectifying transistor proposed in the present disclosure with a conventional control method with only the voltage between the drain and the source of the synchronous rectifying transistor being sampled. It can be clearly seen from this figure that the control system and control method for synchronous rectifying transistor of the present disclosure are different from the conventional control method. In the conventional control method, only the voltage between the drain and the source of the synchronous rectifying transistor is detected, and the turning-on and. turning-off of the bulk diode of the synchronous rectifying transistor is determined, while implementing the drive of the synchronous rectifying transistor by different means. The control method proposed in the present disclosure can effectively make the synchronous rectifying transistor work at the optimal turning-off time point and at the optimal efficiency point, thus effectively avoiding the conduction loss of the bulk diode and improving the working efficiency of the system.

The technical features of the above embodiments can be combined arbitrarily. In order to make the description concise, all possible combinations of the technical features in the above embodiments are not described. However, as long as the combination of these technical features does not conflict, it should be considered as the scope of the description.

The above embodiments only express several embodiments of the present application, the description of which is more specific and detailed, but it cannot be understood as the limitation of the scope of the patent application. It should he pointed out that for those skilled in the art, without departing from the conception of present application, more varieties and modifications can be made, which fall within the scope of the protection of the application. Therefore, the scope of protection of the patent application shall be subject to the appended claims.

What is claimed is:

1. A control system for synchronous rectifying transistor of LLC converter, comprising two control units with the same structure, which control two synchronous rectifying transistors respectively, wherein each control unit includes a voltage sampling circuit, a high-pass filter circuit, a PI compensation and effective value detection circuit, and a control circuit having a microcontroller MCU as a core;

the voltage sampling circuit is configured to collect a voltage $V_{DS(SR)}$ between a drain and a source of a secondary synchronous rectifying transistor during turning-off of the secondary synchronous rectifying transistor, and convert the voltage signal $V_{DS\ (SR)}$ into $V_{samp}$, so as to output $V_{samp}$ to the high-pass filter circuit;

the high pass filter circuit is configured to filter out a direct current component in $V_{samp}$, remaining an alternating current component $V_{hp}$ of an oscillation signal generated by a resonance of parasitic inductance and parasitic capacitance; output the alternating current component $V_{hp}$ of the oscillation signal to the PI compensation and effective value detection circuit for compensating and amplifying, so as to obtain an effective value level $V_{SR}$ of a jitter signal due to resonance after processing; and output the effective value level $V_{SR}$ to the control circuit having a microcontroller MCU as a core;

a current value of $V_{SR}$ is compared with the last collected value by the control unit internal the microcontroller, and then a driving signal is generated by a timer to change a turning-on time of the synchronous rectifying transistor in a next cycle, so that the synchronous rectifying transistor can be turned off at an optimal turning-off point and work at an optimal efficiency point.

2. The control system for synchronous rectifying transistor of LLC converter according to claim 1, wherein the voltage sampling circuit includes a resistor $R_1$, a resistor $R_2$ and a diode $D_b$, one terminal of the resistor $R_1$ is connected to a power supply voltage $V_{cc}$, the other terminal of the resistor $R_1$ is connected to one terminal of the resistor $R_2$ and an anode of the diode $D_b$, a cathode of the diode $D_b$ is connected to a drain of one of the synchronous rectifying transistors on the secondary side of an LLC converter, and the other terminal of the resistor $R_2$ is served as an output terminal of the voltage sampling circuit.

3. The control system for synchronous rectifying transistor of LLC converter according to claim 1, wherein the high-pass filter circuit includes a resistor $R_0$ and a capacitor $C_0$, one terminal of the capacitor $C_0$ is connected to an output terminal of the voltage sampling circuit, the other terminal of the capacitor $C_0$ is connected to one terminal of the resistor $R_0$ and served as an output terminal of the high-pass filter circuit, and the other terminal of the resistor $R_0$ is grounded.

4. The control system for synchronous rectifying transistor of LLC converter according to claim 1, wherein the PI compensation and effective value detection circuit includes an operational amplifier OpAmp, a resistor $R_3$, a resistor $R_4$, a resistor $R_5$, a resistor $R_F$, a capacitor $C_1$, a capacitor $C_F$ and a diode $D_1$, one terminal of the resistor $R_3$ is connected to an output terminal of the high-pass filter circuit, the other terminal of the resistor $R_3$ is connected to an inverting terminal of the operational amplifier OpAmp, one terminal of the resistor $R_4$ is connected to an non-inverting terminal of the operational amplifier OpAmp, the other terminal of resistor $R_4$ is grounded; the resistor $R_F$ is connected to the capacitor $C_F$ in parallel, of which one terminal is connected to the inverting terminal of the operational amplifier OpAmp, the other terminal is connected to an output terminal of the operational amplifier OpAmp and an anode of the diode $D_1$; and the resistor $R_5$ is connected to the capacitor $C_1$ in parallel, of which one terminal is connected to a cathode of the diode $D_1$ and served as an output terminal of the PI compensation and effective value detection circuit, the other terminal of resistor $R_5$ and capacitor $C_1$ in parallel is grounded.

5. The control system for synchronous rectifying transistor of LLC converter according to claim 1, wherein the control circuit having the microcontroller MCU as a core includes an analog-digital converter ADC, a control unit and a timer TIMer, an input terminal of the analog-digital converter ADC is connected to an output terminal of the PI compensation and effective value detection circuit, and an output of the analog-digital converter ADC and the control unit are in double-way connection, an output of the control unit is connected to a gate of one of the synchronous rectifying transistors on the secondary side of the LLC resonant converter via an output of the timer.

6. The control system for synchronous rectifying transistor of LLC converter according to claim 1, wherein the control process of the control system is as follows:

(1) when the synchronous rectifying transistor is turned off, the voltage $V_{DS\ (SR)}$ between the drain and the source of the synchronous rectifying transistor is output after being processed by the sampling circuit, the high-pass filter circuit, and the PI compensation and effective value detection circuit; a voltage $V_{SR}$ of an output terminal of the PI compensation and effective value detection circuit is collected by an internal analog-digital converter ADC of the microcontroller, and the value is converted into a digital quantity after being processed by the analog-digital converter of the microcontroller, and then stored in the control unit of the microcontroller and recorded as $V_{SR0}$;

(2) when the synchronous rectifying transistor is turned off at next time, the output VSR of the PI compensation and effective value detection circuit is also collected, and the value is converted into a digital quantity after being processed by the analog-to-digital converter of the microcontroller, and then stored in the control unit of the microcontroller and recorded as $V_{SR1}$;

(3) by comparing the data $V_{SR0}$, $V_{SR1}$ collected in (1) and (2) with a set threshold $V_{TH}$, a turning-on time of the synchronous rectifying transistor in the next cycle is defined by the control unit, which includes two modes, the value of $V_{TH}$ depends on a specific working state of the system; in a normal circumstance, the value of $V_{TH}$ is set to be 0, and the two modes are as follows:

in a first mode: when the microcontroller detects and determines a potential relationship as $V_{SR0}>V_{SR1}>V_{TH}$ for the first time, the control unit will add a high-level time period $\Delta t$ to the turning-on time of the synchronous rectifying transistor in the next cycle, in other words, the turning-off time of the synchronous rectifying transistor in the next cycle is delayed; after the current comparison is completed, the control unit replaces $V_{SR0}$ with $V_{SR1}$ and proceeds to the sampling preparation stage of the next cycle; until the determining condition reaches to $V_{SR0}>V_{SR1}=V_{TH}$, the control unit will subtract a turning-on time period $\Delta t$ of the synchronous rectifying transistor, return to the previous state, and a fixed turning-on time is kept constant in the next cycle;

in a second mode: when the microcontroller detects and determines the potential relation as $V_{SR0}=V_{SR1}=V_{TH}$ for the first time, the control unit will subtract a high-level time period $\Delta t$ from the turning-on time of the synchronous rectifying transistor in the next cycle, in other words, the turning-off time of the synchronous rectifying transistor in the next cycle is advanced; until the determining condition reaches to $V_{SR1}>V_{SR0}=V_{TH}$, the current turning-on time of the synchronous rectifying transistor will be kept constant in the next cycle by the control unit;

(4) according to the result of comparison in (3), the microcontroller MCU generates a driving signal by setting a value of the internal timer TIMer, so as to define the turning-on time of the synchronous rectifying transistor in the next cycle and implement the control function; further, the control unit in the microcontroller MCU detects every 10 switching cycles of the converter to check whether the determining conditions is still satisfied; if it is satisfied, then the synchronous rectifying transistor continues to work according to the original working state, if it is not satisfied any more, then a new working state is re-detected and determined according to the control process in (3).

7. The control system for synchronous rectifying transistor of LLC converter according to claim 1, wherein when the voltage $V_{DS\ (SR)}$ value between the drain and the source of the synchronous rectifying transistor of the LLC resonant converter which is processed by an external circuit is sampled, the voltage is accurately sampled by means of the timer TIMer in the microcontroller MCU, and a fixed time length is set by the timer TIMer in each switching cycle; when a falling edge of the timer reaches, the microcontroller performs an interrupt process, and samples the output of the PI compensation and effective value detection circuit.

8. A control method for synchronous rectifying transistor of LLC converter, the LLC converter including a primary side of transformer and a secondary side of transformer, the secondary side of the transformer including a secondary synchronous rectifying transistor, comprising:

collecting a voltage $V_{DS\ (SR)}$ between a drain and a source of the secondary synchronous rectifying transistor during turning-off of the secondary synchronous rectifying transistor, and converting the voltage $V_{DS\ (SR)}$ into a voltage signal $V_{samp}$;

filtering out a direct current component in the voltage signal $V_{samp}$ by a high-pass filter circuit, remaining an alternating current component $V_{hp}$ of an oscillating signal generated by a resonance of parasitic inductance and parasitic capacitance;

compensating and amplifying the alternating current component $V_{hp}$ to obtain an effective value level $V_{SR}$ of a jitter signal due to resonance after processing; and comparing a current value of the effective value level $V_{SR}$ with the $V_{SR}$ obtained when the secondary synchronous rectifying transistor was turned off last time, and obtaining a driving signal according to a comparison result to control a turning-on time of the secondary synchronous rectifying transistor in the next cycle.

9. The method according to claim 8, wherein the driving signal is used to turn off the secondary synchronous rectifying transistor at an optimal turning-off point, so that the synchronous rectifying transistor works at an optimal efficiency point.

10. The method according to claim 8, wherein a storage unit is also included for storing a digital quantity of the effective value level $V_{SR}$ obtained at each time the secondary synchronous rectifying transistor is turned off.

11. The method according to claim 8, wherein the step of comparing a current value of the effective value level $V_{SR}$ with the $V_{SR}$ obtained when the secondary synchronous rectifying transistor was turned off last time, and obtaining a driving signal according to the comparison result comprises:

when $V_{SR0}>V_{SR1}>V_{TH}$, the turning-on time of the secondary synchronous rectifying transistor in the next cycle is increased; the turning-on time of the secondary synchronous rectifying transistor is kept constant until $V_{SR0}>V_{SR1}=V_{TH}$;

when $V_{SR0}=V_{SR1}=V_{TH}$, the turning-on time of the secondary synchronous rectifying transistor in the next cycle is decreased, the turning-on time of the secondary synchronous rectifying transistor is kept constant until $V_{SR1}>V_{SR0}=V_{TH}$;

wherein, $V_{SR1}$ is the current value of the effective value level $V_{SR}$, $V_{SR0}$ is the $V_{SR}$ obtained when the secondary synchronous rectifying transistor was turned off last time, and $V_{TH}$ is a preset threshold value.

12. The method according to claim 11, wherein the turning-on time increased at each time is constant, and equals to the turning-on time decreased at each time.

13. The method according to claim 11, wherein the $V_{TH}=0$.

14. The method according to claim 11, wherein when $V_{SR0}>V_{SR1}=V_{TH}$ and after the turning-on time of the secondary synchronous rectifying transistor is kept constant, and when $V_{SR1}>V_{SR0}=V_{TH}$ and after the turning-on time of the secondary synchronous rectifying transistor is kept constant, the step of detecting and comparing the current value of the effective value level $V_{SR}$ with the $V_{SR}$ obtained when the secondary synchronous rectifying transistor was turned off last time is re-performed every a first preset time length.

15. The method according to claim 14, wherein the first preset time length is 10 switching cycles of the LLC converter.

16. The method according to claim 8, wherein the step of obtaining a driving signal according to the comparison result is generating a driving signal by means of a timer.

17. The method according to claim 16, further comprising a step of setting a fixed time length by means of the timer in each switching cycle of the LLC converter;

the step of collecting the voltage $V_{DS(SR)}$ between the drain and the source of the secondary synchronous rectifying transistor during turning-off of the secondary synchronous rectifying transistor is sampling with the timer;

the step of compensating and amplifying the alternating current component $V_{hp}$, to obtain the effective value level $V_{SR}$ of the jitter signal due to resonance after processing is performed an interrupt process to sample the effective value level $V_{SR}$ when a falling edge of the timer reaches.

* * * * *